Sept. 10, 1946.  F. E. CREVER  2,407,476
ELECTRIC CIRCUIT
Filed June 6, 1944

Inventor:
Frederick E. Crever,
by Harry E. Dunham
His Attorney.

Patented Sept. 10, 1946

2,407,476

UNITED STATES PATENT OFFICE 2,407,476

ELECTRIC CIRCUIT

Frederick E. Crever, Scotia, N. Y., assignor to General Electric Company, a corporation of New York Application June 6, 1944, Serial No. 538,933

8 Claims. (Cl. 171—223)

This invention relates to electric circuits and more particularly to improvements in automatic polyphase alternating-current regulating circuits.

It is often desirable to provide the main control element of regulators for polyphase circuits with polyphase voltage response and also with line current response. The latter response is usually for obtaining line drop compensation or circulating current compensation in case of parallel operation. In accordance with a principal feature of this invention there is provided a novel and simple network for obtaining from a polyphase circuit a single-phase voltage which is proportional to the positive phase sequence component of the voltage of the polyphase circuit. This single-phase voltage is in quadrature with the current in one of the lines of the polyphase circuit at unity power factor of said circuit. This network is made extremely sensitive to changes in regulated voltage by means of a saturated reactor, which, however, introduces a frequency error. In accordance with another feature of the invention, novel frequency compensating means is provided for the circuit.

An object of the invention is to provide a new and improved electric circuit.

Another object of the invention is to provide a new and improved symmetrical phase sequency segregating network.

A further object of the invention is to provide a novel highly sensitive frequency compensated positive phase sequence responsive regulator control circuit.

An additional object of the invention is to provide a new and improved automatic regulator system.

The invention will be better understood from the following description taken in connection with the accompanying drawing and its scope will be pointed out in the appended claims.

Figure 1:
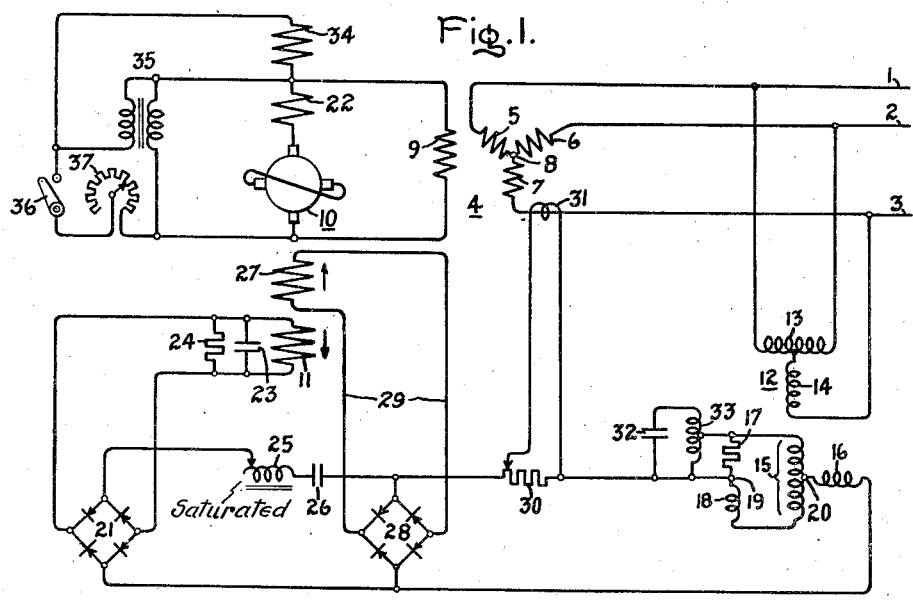
Figure 2:
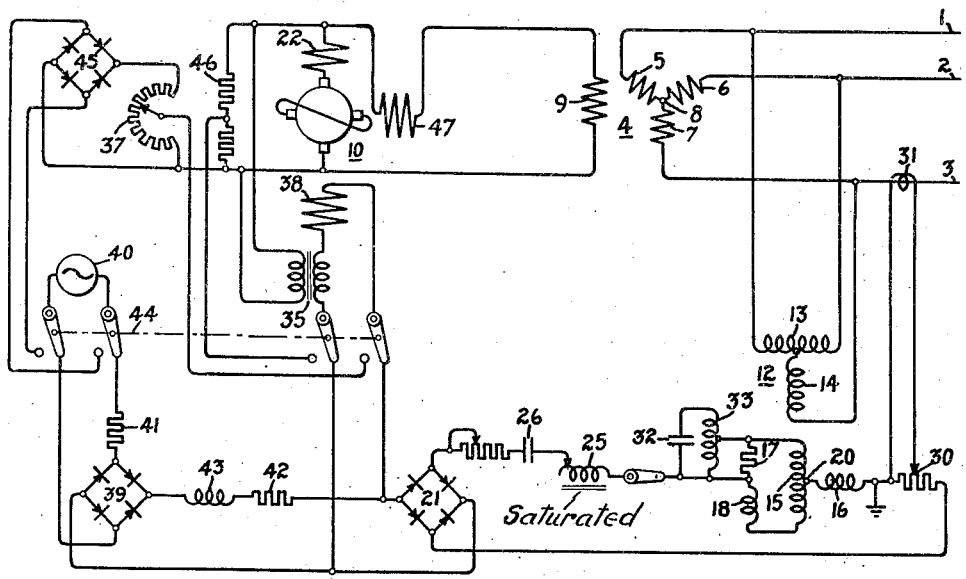

In the drawing Fig. 1 is a diagrammatic illustration of an embodiment of the invention which is provided with a pair of differentially-acting control windings and Fig. 2 is a modification which provides a novel circuit for differentially energizing a single control winding.

Referring now to Fig. 1 of the accompanying drawing, which illustrates diagrammatically an embodiment of the invention as applied to an automatic three-phase generator voltage regulating system, there is shown therein a main regulated three-phase alternating-current circuit comprising conductors 1, 2 and 3. This circuit is energized by an alternator 4 having phase windings 5, 6 and 7 connected respectively to the line conductors 1, 2 and 3 and to a common neutral point 8. The alternator 4 is provided with a direct-current field winding 9 which is energized by the armature voltage of a direct-current exciter 10.

The excitation of the exciter 10 is controlled by a bucking field winding 11 which is energized in accordance with the voltage of the main alternating-current circuit in the manner which will now be described.

Connected across the main alternating-current circuit is a T-connected potential transformer 12, the primary of which has its main winding 13 connected across conductors 1 and 2 and has the teaser winding 14 connected between line conductor 3 and the mid-point of main winding 13. The voltage of teaser winding 14 is, of course, .866 times the voltage of main winding 13 so that the voltages between the two terminals of main winding 13 and the terminal of teaser winding 14 are all equal and all displaced 120 degrees. The secondary of potential transformer 12 differs from the ordinary three-phase to two-phase T-connected transformer in that the two phases of the secondary do not have equal voltages and the phase 15 which is excited by the teaser winding 14 has twice the voltage of the phase 16 which is excited by the main winding 13, and this latter half-voltage winding is connected to the mid-point of the full-voltage winding of the secondary so as to form a T connection. Serially connected across the high-voltage secondary winding 15 are a resistor 17 and a reactor 18 which have equal ohmic values at the normal frequency of the main circuit; that is to say, the reactance in ohms of the reactor 18 is numerically equal to the resistance in ohms of the resistor 17. Consequently, the voltage between the junction point 19 of the resistor and the reactor and the point 20 where the windings 15 and 16 are interconnected is equal to one-half the voltage of the winding 15 and is therefore equal to the voltage of the winding 16. Thus, the voltage between the point 19 and the free terminal of the winding 16 will be either twice the voltage of the winding 16 or will be zero, depending upon whether the voltage between the points 19 and 20 is in phase with or in phase opposition with the voltage of the winding 16, and this depends upon the phase rotation of the main circuit. The main circuit is assumed to have 1—2—3 phase rotation and with this phase rotation the voltage between the point 19 and the free terminal of the winding 16 will be twice the voltage of the winding 16 so that the voltage between these points will be a measure of the positive phase sequence voltage of the main circuit in that it will disappear for negative phase sequence voltages. If the main circuit has the opposite phase rotation, the network will respond to the negative phase sequence voltage of the circuit.

Point 19 is connected to one of the input terminals of a full-wave rectifier 21 and the free terminal of winding 16 is connected to the other input terminal of the rectifier 21. The direct-current output terminals of this rectifier are connected to the bucking control field winding 11 for the exciter 10.

The exciter 10 is provided with a series winding 22 which is sufficiently strong to cause it to self-excite and build up to its ceiling voltage. However, before it can reach its ceiling voltage, the voltage of the alternator will reach a predetermined normal value at which the ampere turns of the bucking winding 11 will be sufficiently strong to limit further increases in excitation and voltage of the exciter. The exciter is also preferably a high-speed high-amplification machine, such as an amplidyne which is provided with cross armature reaction excitation as described and claimed in Patent 2,227,992, granted January 7, 1941, on a joint application of M. A. Edwards and E. F. W. Alexanderson and assigned to the assignee of the present application.

In order to increase the sensitivity of the bucking field circuit and also to decrease the peak inverse voltage on rectifier 21, capacitor 23 is connected across bucking field 11. Resistor 24 has a high value and its purpose is to prevent spurious oscillations.

The sensitivity of the regulator system is increased by connecting a saturated reactor 25 in series with the input terminals of the rectifier 21. The voltage drop through the impedance network which supplies the rectifier 21 is reduced to a minimum by means of a series capacitor 26 so that the current in the winding 11 which is supplied by the impedance network produces a minimum amount of voltage drop in the circuit through which it flows.

A boosting field winding 27 and rectifier 28, which is connected across the output of the positive phase sequence network before it goes through saturated reactor 24, are interconnected by wire 29 for the purpose of preventing polarity reversal of the exciter and to supply additional speed of response in the boosting direction.

The output voltage of the positive sequence network being in phase with the voltage of winding 16, which in turn is in phase with the voltage of winding 13, is in quadrature with the voltage of phase 7 of the armature of the alternator 4 so that it will be in quadrature with the current in the line 3 at unity power factor operation of the alternator 4. Therefore, when a simple resistor 30 is connected in series with the output of the positive phase sequence network and current is circulated through it from a current transformer 31 in line 3, the voltage drop in the resistor 30 will be in quadrature with the voltage of the positive phase sequence network during unity power factor conditions. This voltage will then add or subtract from the positive phase sequence network voltage depending upon whether the line current is leading or lagging and thus circulating current compensation may readily be obtained when the generator 4 operates in parallel with other generators.

The control circuit is compensated for variations in input frequency by means of a parallel resonant circuit connected across the resistor 17. As shown, this consists of a capacitor 32 and a reactor 33 in the form of a step-up auto-transformer. These devices are tuned to resonance at the normal frequency of the system so that they have extremely high net reactance and do not affect the operation of the circuit at normal frequency. However, if the frequency departs from normal, then the frequency compensating circuit is no longer resonant and the departure from resonance compensates for the change in voltage held by the saturated reactor so that even though the reactor saturates at a different voltage dependent upon the frequency, the primary voltage maintained is independent of frequency. The action of the frequency compensator produces no substantial shift in phase of the output voltage of the positive phase sequence network over an appreciable range of variation in frequency.

Hunting of the system is prevented by an anti-hunt control winding 34 for the exciter which is energized through a stabilizing transformer 35 whose primary winding is connected across the armature of the exciter. When desired, manual control of the voltage of the exciter, and hence of the alternator, may be obtained by closing a switch 36 which connects the anti-hunt winding 34 across the armature of exciter 10 through a manually operable rheostat 37, thus providing shunt field rheostatic control.

The operation of most of the elements of Fig. 1 has already been largely covered in connection with the above description. In general, if the alternator and the exciter are being driven at rated speed by a suitable prime mover, or prime movers, and if the switch 36 is open, the system will maintain the voltage of the output circuit 1, 2, 3 substantially constant at a value determined by the adjustment of the saturated reactor 25 for wide variations in load and power factor and for appreciable variations in speed. Thus, any decrease in voltage will cause the current in the bucking winding to decrease more rapidly, that is, by a larger percentage, than the current decreases in the boosting winding, thus decreasing the net bucking ampere-turns of the two field windings and allowing the series exciter to build up to a higher voltage and thus to restore the voltage of the main circuit to normal. Similarly, an increase in voltage of the main circuit will increase the bucking ampere turns faster than it increases the boosting ampere turns so that there is a net increase in bucking ampere turns and the voltage of the exciter is consequently reduced.

The positive phase sequence response of the system insures that the action of the regulating system will be in the proper direction regardless of how unbalanced the voltages of the three-phase circuit are.

In the modification shown in Fig. 2, the opposed field windings 27 and 11 of Fig. 1 are replaced by a single control field winding 38 which is energized by a differential current obtained from rectifier 21 and a rectifier 39 which is energized from an auxiliary current source in the form of a small alternator 40. The output terminals of the rectifiers 21 and 39 are connected with additive or cumulative polarity in a closed series circuit and the winding 38 is connected across this circuit. As long as the output currents of the two rectifiers 21 and 39 are equal, the control winding 38 will be deenergized, but as soon as the output currents of the rectifiers become unequal, the control winding 38 will carry the difference between the output currents of the two rectifiers and this difference current will flow in opposite directions depending upon which rectifier has the greater output current.

Current limiting resistors 41 and 42 are connected in the input side of the rectifier 39 and in the common series circuit for the outputs of both rectifiers and also a smoothing reactor 43 is connected in the latter circuit.

Due to the extreme sensitivity of the circuit resulting from the saturation of the reactor 25, small variations in voltage of the alternator 40 will have very little effect on the regulated output voltage of the main alternator 4.

The operation of Fig. 2 is generally the same as that of Fig. 1 in that the circuit is so adjusted that at normal voltage of the main alternator the difference in output currents of the rectifiers 21 and 39 will energize control winding 38 with the proper amount of current to provide the necessary excitation for the main alternator. If now the alternator voltage departs from this normal value even slightly, there will be a relatively large change in output current of the rectifier 21 thus causing a relatively large change in current in the winding 38 and this change will be in such direction as to restore the voltage of the alternator substantially to normal.

In Fig. 2 the anti-hunting field winding 34 of the exciter has been omitted and the secondary winding of the stabilizing transformer 35 has been connected directly in series with the single differentially energized control winding 38 so that changes in voltage of the exciter will, by means of the stabilizing transformer 35, induce voltages in the circuit of the winding 38 which are of such direction as to counteract the change in exciter voltage and thus prevent overshooting or hunting of the regulator system.

When it is desired to control the voltage of the main alternator 4 manually, a switch 44 is moved to the left, thus connecting the alternator 40 to a rectifier 45 whose output terminals are connected across the resistance of the manually operated field control rheostat 37. The switch 44 when moved to the left also connects the control field winding 38 between the moving contact of the rheostat 37 and an intermediate point on a voltage divider 46 which is connected across the armature circuit of the exciter 10. Thus, any operation of the rheostat will cause a change in energization of the control winding 38 which in turn will cause a change in the exciter voltage and this action will continue until the change in exciter voltage causes the voltage divider 46 to produce a voltage substantially equal to the changed voltage of the rheostat. In this manner very stable operation of the manual voltage control circuit is obtained.

In Fig. 2 the exciter has also been provided with a conventional series winding 47 for providing a predetermined amount of the excitation of this machine. In some instances this series field winding can be so strong that it tends to saturate the exciter and under these circumstances the control winding 38 will normally act to hold the voltage of the exciter down to the required value corresponding to the normal voltage of the main alternator 4.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. A symmetrical phase sequence network comprising, in combination, a T-connected transformer having a three-phase primary winding and a two-phase secondary winding, one of the phases of said secondary winding having half the voltage of the other and having one terminal thereof connected to the mid-point of said other phase, a resistor and an equal ohmic value reactor connected in series across said other secondary phase, and output terminals connected respectively to the free terminal of the lower voltage secondary phase and to the junction of said resistor and reactor.

2. A symmetrical phase sequence network comprising, in combination, a T-connected transformer having a three-phase primary winding and a two-phase secondary winding, one of the phases of said secondary winding having half the voltage of the other and having one terminal thereof connected to the mid-point of said other phase, a resistor and an equal ohmic value reactor connected in series across the higher voltage secondary phase, output terminals connected respectively to the free terminal of the low voltage secondary phase and to the junction of said resistor and reactor, and frequency compensating means comprising a parallel resonant circuit connected across said resistor.

3. In combination, a polyphase alternating-current circuit, means for regulating the voltage of said circuit, a control element for said regulating means, means including an impedance network for deriving from said circuit a single-phase voltage which is proportional to the positive phase sequence voltage of said circuit and which is in quadrature with one of the line currents of said circuit at unity power factor, means for vectorially adding to said single-phase voltage another single-phase voltage which corresponds in phase and is proportional in magnitude to said line current, and means for energizing said control element in accordance with the vector sum of said single-phase voltages.

4. In combination, a polyphase alternating-current circuit, means for regulating the voltage of said circuit, a control element for said regulating means, means including an impedance network for deriving from said circuit a single-phase voltage which is proportional to the positive phase sequence voltage of said circuit, means including a series saturated reactor for energizing said control element in accordance with said single-phase voltage, and means for compensating said network for the effect of frequency changes on said saturable reactor.

5. In combination, an automatic electric regulator, an electroresponsive control element therefor, a pair of rectifiers having their output terminals connected with cumulative polarity in a closed series circuit, means for energizing said rectifiers in such a manner that their relative energizations vary with variations in a regulated quantity, and means for connecting said electroresponsive control element across said circuit so as to be energized by the difference between the rectifier output currents.

6. In combination, an automatic electric regulator, an electroresponsive control element therefor, a pair of rectifiers having their output terminals connected with cumulative polarity in a closed series circuit, means for energizing one of said rectifiers with a substantially constant alternating voltage, means for energizing the other of said rectifiers with an alternating voltage which varies in accordance with the magnitude of a regulated quantity, and means for connecting said electroresponsive control element across said circuit so as to be energized by the difference between the rectifier output currents.

7. In combination, a dynamo-electric machine, a field winding for controlling the excitation of said machine, a pair of rectifiers having their output terminals connected with cumulative polarity in a closed series circuit, means for energizing one of said rectifiers with a substantially constant alternating voltage, means for energizing the other of said rectifiers with an alternating voltage which varies non-linearly in response to variations in the voltage of said dynamo-electric machine, and means for connecting said field winding across said circuit so as to be energized by the difference between the rectifier output currents.

8. In combination, a dynamo-electric machine, a field winding for controlling the excitation of said machine, a pair of rectifiers having their output terminals connected with cumulative polarity in a closed series circuit, means for energizing said rectifiers in such a manner that their relative energizations vary with variations in an operating condition of said machine, and means for connecting said field winding across said circuit so as to be energized with the difference between the rectifier output currents.

FREDERICK E. CREVER.